United States Patent
Hsiao

(10) Patent No.: US 7,597,869 B2
(45) Date of Patent: Oct. 6, 2009

(54) METHOD FOR PRODUCING CARBON NANOTUBES

(75) Inventor: Bor-Yuan Hsiao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 500 days.

(21) Appl. No.: 11/447,477

(22) Filed: Jun. 5, 2006

(65) Prior Publication Data
US 2007/0110659 A1    May 17, 2007

(30) Foreign Application Priority Data
Oct. 13, 2005    (CN) .................. 2005 1 0100386

(51) Int. Cl.
*D01C 5/00* (2006.01)
*C01B 31/00* (2006.01)

(52) U.S. Cl. ............... 423/447.3; 423/445 R; 423/447.1; 423/447.2; 977/742; 977/750; 977/752

(58) Field of Classification Search ............ 423/445 R, 423/447.1, 447.2, 447.3; 977/742, 750, 752
See application file for complete search history.

(56) References Cited

U.S. PATENT DOCUMENTS 6,180,049 B1 * 1/2001 Jang et al. .............. 264/401

6,759,025 B2 7/2004 Hong et al.
2003/0064169 A1 * 4/2003 Hong et al. ............. 427/569

OTHER PUBLICATIONS

Kwok, K.; Chiu, W. K. S. Deposition rate and temperature of carbon films during laser-induced CVD on a moving substrate, Carbon 41 (2005), 2295-2305.*
Kwok, K.; Chiu, W. K. S. Continuous deposition of carbon nanotubes on a moving substrate by open-air laser-induced chemical vapor deposition, Carbon 43 (2005), 2571-2578.*
Westberg, H.; Borman, M. Free-standing silicon microstructures fabricated by laser chemical processing, J. Appl. Phys. 73 (11), Jun. 1, 1993.*

* cited by examiner

*Primary Examiner*—Jerry Lorengo
*Assistant Examiner*—Carlos Barcena
(74) *Attorney, Agent, or Firm*—Frank R. Niranjan

(57) ABSTRACT

An exemplary method for producing carbon nanotubes includes the following steps. First, a reaction chamber is provided. The reaction chamber defines a reaction region therein. Second, a substrate having a catalyst layer formed thereon is provided. Third, the substrate is disposed in the reaction chamber. Fourth, a carbon-containing reactive gas is introduced into the reaction chamber so as to grow carbon nanotubes using a chemical vapor deposition method. The substrate is moved along a direction opposite to a growth direction of the carbon nanotubes whilst growing the carbon nanotubes, whereby tips of the carbon nanotubes are kept in the reaction region while the substrate is moved.

12 Claims, 1 Drawing Sheet

METHOD FOR PRODUCING CARBON NANOTUBES

TECHNICAL FIELD

The present invention relates to apparatuses and methods for producing carbon nanotubes, and more particularly to an apparatus and a method for producing carbon nanotubes using chemical vapor deposition.

BACKGROUND

Carbon nanotubes are a relatively new material having a hollow tubular structure composed of carbon atoms. Carbon nanotubes have excellent electrical, magnetic, nonlinear optical, thermal, and mechanical properties, such as possessing a high Young's modulus, a high elastic modulus, and a low density. Depending on their length, diameter, and mode of spiraling, carbon nanotubes can exhibit metallic or semiconductor properties. They are widely used in a variety of diverse fields, such as nanometer-scale electronics, materials science, biological science, and chemistry.

At present, methods for producing carbon nanotubes include an arc discharge method, a pulsed laser vaporization method, and a chemical vapor deposition method. The chemical vapor deposition method generally uses transition metals or oxides as a catalyst to grow carbon nanotubes at high temperature by decomposition of carbon-containing reactive gas. Compared with these two methods, the chemical vapor deposition method is superior in operational simplicity, low cost, and mass production, therefore the chemical vapor deposition method has become widely used.

A typical chemical vapor deposition method for producing carbon nanotubes includes the steps of: providing a substrate coated with a catalyst layer on a surface; putting the substrate in a reaction device; heating the reaction device; introducing a carbon-containing reactive gas and thereby growing carbon nanotubes on the substrate.

However, when using a typical method to produce carbon nanotubes after about 5 to 30 minutes, the rate of precipitation of carbon is greater than that of diffusion of carbon. Thus, the catalyst particles become blocked by accumulation of the decomposed carbon of the carbon-containing reactive gas. Therefore, the carbon nanotubes stop growing at a short length.

What is needed, therefore, is an apparatus and a method for producing carbon nanotubes that can have greater length.

SUMMARY

In a preferred embodiment, an apparatus for producing carbon nanotubes includes a reaction chamber, a substrate holding member, and a driving member. The holding member is disposed inside the reaction chamber configured for holding a substrate for growing carbon nanotubes thereon. The driving member is disposed in the reaction chamber and is configured for driving the holding member to move along a direction opposite to a growth direction of the carbon nanotubes in the reaction chamber.

In another preferred embodiment, a method for producing carbon nanotubes includes the steps of: providing a reaction chamber; providing a substrate having a catalyst layer thereon; disposing the substrate in the reaction chamber; introducing a carbon-containing reactive gas into the reaction chamber so as to grow carbon nanotubes using chemical vapor deposition method; and moving the substrate along a direction opposite to a growth direction of the carbon nanotubes whilst growing the carbon nanotubes.

Other advantages and novel features will become more apparent from the following detailed description of the present apparatus and method for producing carbon nanotubes when taken in conjunction with the accompanying drawings.

BRIEF DESCRIPTION OF THE DRAWING

Many aspects of the apparatus and method for producing carbon nanotubes can be better understood with reference to the following drawing. The components in the drawing are not necessarily drawn to scale, the emphasis instead being placed upon clearly illustrating the principles of the present invention. Moreover, in the drawing, like reference numerals designate corresponding parts.

DETAILED DESCRIPTION OF PREFERRED EMBODIMENT

Figure 1:
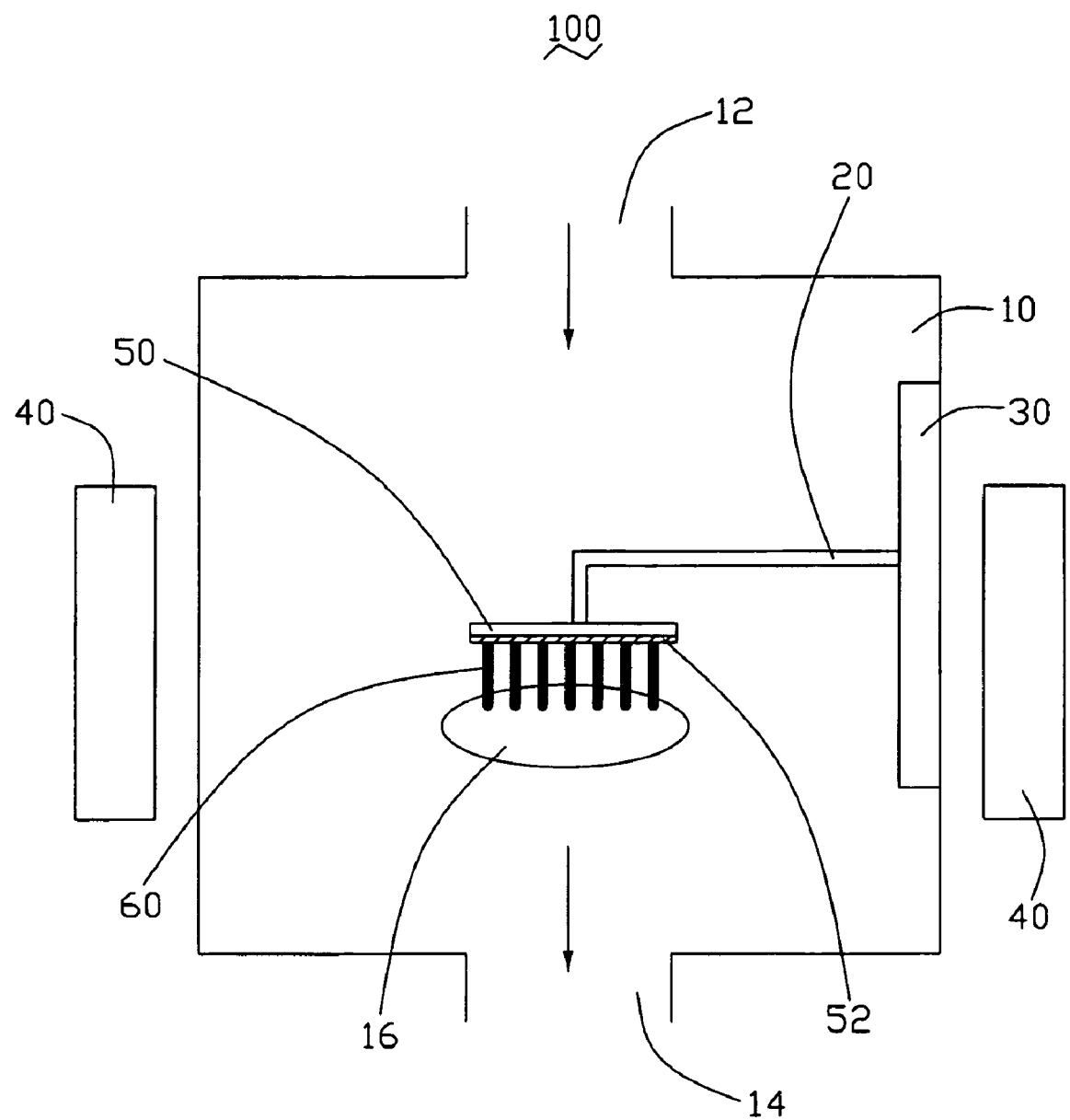
FIG. 1 is a schematic view of an apparatus for producing carbon nanotubes, in accordance with a preferred embodiment.

Reference will now be made to the drawing FIGURE to describe the preferred embodiment of the present apparatus and method for producing carbon nanotubes in detail.

Referring to FIG. 1, an apparatus 100 for producing carbon nanotubes in accordance with a preferred embodiment is shown. The apparatus 100 includes a reaction chamber 10, a substrate holding member 20, a driving member 30, and a heating member 40.

A gas inlet port 12 and a gas outlet port 14 are located at two opposite ends of the reaction chamber 10. At least one carbon-containing reactive gas is introduced into the reaction chamber 10 through the gas inlet port 12. The reactive gas which is not reacted is discharged from the gas outlet port 14. Typically, the gas inlet port 12 is disposed at the upper end of the reaction chamber 10 and the gas outlet port 14 is disposed at the bottom end.

The holding member 20 is located inside the reaction chamber 10 and is used to support a substrate 50 for growing carbon nanotubes thereon. In this embodiment, the holding member 20 is a cantilever. One end of the cantilever is connected with the driving member 30 and the other end supports the substrate 50 thereon.

The driving member 30 may be arranged on the inner surface of the reaction chamber 10 and is configured to move the holding member 20 along with the substrate 50 in the reaction chamber 10. In this embodiment, the driving member 30 comprises a guide rail.

The heating member 40 is arranged around the reaction chamber 10 for heating the reaction chamber 10. The heating member 40 is either a high temperature furnace or a high frequency furnace (e.g. a microwave furnace).

It is recognized that the apparatus 100 for producing carbon nanotubes generally defines a reacting region 16 at which the carbon nanotubes grow faster. The reaction region 16 may generally be associated with the configuration of the reaction chamber 10, the flowing route of the reactive gas, and the arrangement/location of the substrate 50. Therefore, the present apparatus 100 uses the driving member 30 to move the substrate 50. Thus, tips of the carbon nanotubes 60 are kept in the reacting region 16, and growth of the carbon nanotubes 60 is thereby maintained. The substrate 50 moves along a direction opposite to the growth direction of the carbon nanotubes 60, therefore, the carbon nanotubes 60 can grow to a needed length. Under the influence of gravity, the collimation of carbon nanotubes 60 is good.

A method for producing carbon nanotubes using the apparatus 100 is described in detail below.

In step 1, the apparatus 100 for producing carbon nanotubes is provided.

In step 2, the substrate 50 is provided. The substrate 50 has a catalyst layer 52 deposited on a surface thereof The substrate 50 coated with the catalyst layer 52 is held by the holding member 20. The surface having the catalyst layer 52 faces the gas outlet port 14. The substrate 50 is made of a material selected from the group consisting of silicon, quartz, and glass. The catalyst layer 52 is made of iron, cobalt, nickel, or an alloy including at least two of the three. The catalyst layer 52 can be deposited by, for example, an ion deposition method, a radio frequency sputtering method, a vacuum vapor method, or a chemical vapor deposition method.

In step 3, a carbon-containing reactive gas is introduced into the reaction chamber 10, the heating member 40 heats the substrate 50 to a predetermined temperature, for example, 500 to 900 degrees centigrade, thereby producing carbon nanotubes 60 through chemical vapor deposition. During the growth of the carbon nanotubes 60, the driving member 30 moves the holding member 20 in a direction opposite to a growth direction of the carbon nanotubes 60 in the reaction chamber 10. At this temperature, the carbon-containing reactive gas decomposes and carbon atoms are released from the reactive gas and deposited onto the catalyst layer 52. Thus, the carbon nanotubes 60 grow from the catalyst layer 52. During growth of the carbon nanotubes 60, the driving member 30 moves the substrate holding member 20 away the from the growth direction of the carbon nanotubes 60, therefore the tips of the carbon nanotubes 60 are kept in the reacting region 16. The substrate holding member 20 may be moved at a speed equal to the growth speed of the carbon nanotubes.

The carbon-containing reactive gas can be introduced into the reaction chamber 10 with a carrier gas. The reactive gas is selected the group consisting of methane, acetylene, ethylene, carbon monoxide, and a suitable mixture thereof The carrier gas is selected from the group consisting of hydrogen, helium, argon, ammonia and any suitable combination thereof.

The reacting region 16 is defined as a region suitable for carbon nanotubes growth. The temperature of the reacting region 16 is in the range from about 500 to 900 degrees centigrade. The position of the reacting region 16 in the reaction chamber 10 is relatively constant. In the reacting region 16 the rate of precipitation of carbon is less than that of diffusion of carbon. Therefore, the surface of the catalyst particles is not blocked by accumulation of decomposed carbon from the carbon-containing reactive gas. Thus, the carbon nanotubes 60 can grow to a greater length.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A method for producing carbon nanotubes, comprising the steps of:
   providing a reaction chamber defining a reacting region therein;
   providing a substrate having a catalyst layer formed thereon;
   disposing the substrate in the reaction chamber;
   introducing a carbon-containing reactive gas into the reaction chamber so as to grow carbon nanotubes using a chemical vapor deposition method; and
   moving the substrate along a direction opposite to a growth direction of the carbon nanotubes whilst growing the carbon nanotubes, wherein tips of the carbon nanotubes remain in the reacting region while the substrate is moving.

2. The method as claimed in claim 1, further comprising a step of heating the reaction chamber.

3. The method as claimed in claim 1, wherein the carbon-containing reactive gas is introduced into the reaction chamber with a carrier gas.

4. The method as claimed in claim 3, wherein the carbon-containing reactive gas is selected from the group consisting of methane, acetylene, ethylene, carbon monoxide, and a suitable mixture thereof.

5. The method as claimed in claim 3, wherein the carrier gas is selected from the group consisting of hydrogen, helium, argon, and ammonia.

6. The method as claimed in claim 3, further comprising forming the catalyst layer by a method selected from the group consisting of an ion beam deposition method, a radio frequency sputtering method, a vacuum vapor method, and a chemical vapor deposition method.

7. A method for producing carbon nanotubes, comprising:
   providing a reaction chamber having a gas inlet and a gas outlet;
   providing a driving member inside the reaction chamber;
   providing a holder having a first end connected with the driving member, and an opposite second end;
   providing a substrate having a catalyst layer formed thereon;
   disposing the substrate in the reaction chamber and holding the substrate using the second end of the holder;
   introducing a carbon-containing reactive gas into the reaction chamber so as to grow carbon nanotubes using a chemical vapor deposition method; and
   moving the holder together with substrate along a direction opposite to a growth direction of the carbon nanotubes whilst growing the carbon nanotubes, wherein the reaction chamber defines a reacting region therein, and tips of the carbon nanotubes remain in the reacting region while the substrate is moving.

8. The method as claimed in claim 7, wherein catalyst layer faces toward the gas outlet.

9. The method as claimed in claim 8, wherein the gas inlet and the gas outlet cooperatively define a gas flow direction, and the growth direction is substantially parallel to the gas flow direction.

10. The method as claimed in claim 9, further comprising providing a heating member around the reaction chamber for heating the reaction chamber.

11. The method as claimed in claim 9, wherein the driving member is arranged in an inner wall of the reactive chamber.

12. The method as claimed in claim 9, wherein the carbon-containing reactive gas is introduced into the reaction chamber with a carrier gas.

* * * * *

UNITED STATES PATENT AND TRADEMARK OFFICE
CERTIFICATE OF CORRECTION

PATENT NO. : 7,597,869 B2 Page 1 of 1
APPLICATION NO. : 11/447477
DATED : October 6, 2009
INVENTOR(S) : Bor-Yuan Hsiao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this

Twenty-eighth Day of September, 2010

David J. Kappos
*Director of the United States Patent and Trademark Office*